United States Patent
Ittogi et al.

(10) Patent No.: US 11,743,078 B2
(45) Date of Patent: Aug. 29, 2023

(54) DATA CARRIER APPARATUS, DATA CARRIER DRIVE APPARATUS, DATA COMMUNICATION SYSTEM, IMAGE FORMING APPARATUS AND REPLACEMENT UNIT FOR THE SAME

(71) Applicant: CANON KABUSHIKI KAISHA, Tokyo (JP)

(72) Inventors: Hirotaka Ittogi, Kanagawa (JP); Tsutomu Ishida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/172,115

(22) Filed: Feb. 10, 2021

(65) Prior Publication Data

US 2021/0258195 A1    Aug. 19, 2021

(30) Foreign Application Priority Data

Feb. 13, 2020    (JP) ................................ 2020-022668

(51) Int. Cl.
*H04L 25/49*    (2006.01)
*H04L 25/06*    (2006.01)

(52) U.S. Cl.
CPC ........ *H04L 25/4902* (2013.01); *H04L 25/061* (2013.01)

(58) Field of Classification Search
CPC .......................... H04L 25/4902; H04L 25/061
See application file for complete search history.

(56) References Cited

U.S. PATENT DOCUMENTS

| | | | |
|---|---|---|---|
| 10,469,243 B2 | 11/2019 | Ittogi et al. | |
| 10,637,699 B2 | 4/2020 | Iijima et al. | |
| 2006/0098691 A1* | 5/2006 | Yamazaki | H03M 5/04 370/518 |
| 2007/0288780 A1* | 12/2007 | Yamazaki | H03K 19/003 713/322 |
| 2009/0323785 A1* | 12/2009 | Yamazaki | H04L 25/0264 375/354 |
| 2014/0169443 A1* | 6/2014 | Karino | H04L 25/4902 375/238 |
| 2019/0165974 A1* | 5/2019 | Iijima | H04L 27/1563 |
| 2020/0021424 A1 | 1/2020 | Ittogi et al. | |

FOREIGN PATENT DOCUMENTS

JP    4393351 B2    1/2010

* cited by examiner

*Primary Examiner* — Nader Bolourchi
(74) *Attorney, Agent, or Firm* — Venable LLP

(57) ABSTRACT

A system includes a data carrier drive apparatus and a data carrier apparatus. The data carrier apparatus includes a unit to output transmission data during a first state and adjustment data during a second state, and a current changer configured to change a current value of a current flowing from the data carrier drive apparatus to the data carrier apparatus according to data values of the transmission data and the adjustment data. The data carrier drive apparatus includes a detector to detect a detection value corresponding to the current value of the current, a determiner to determine the data value of the transmission data by comparing the detection value with a threshold value during the first state, and an updater to update the threshold value based on the detection value during the second state.

20 Claims, 12 Drawing Sheets

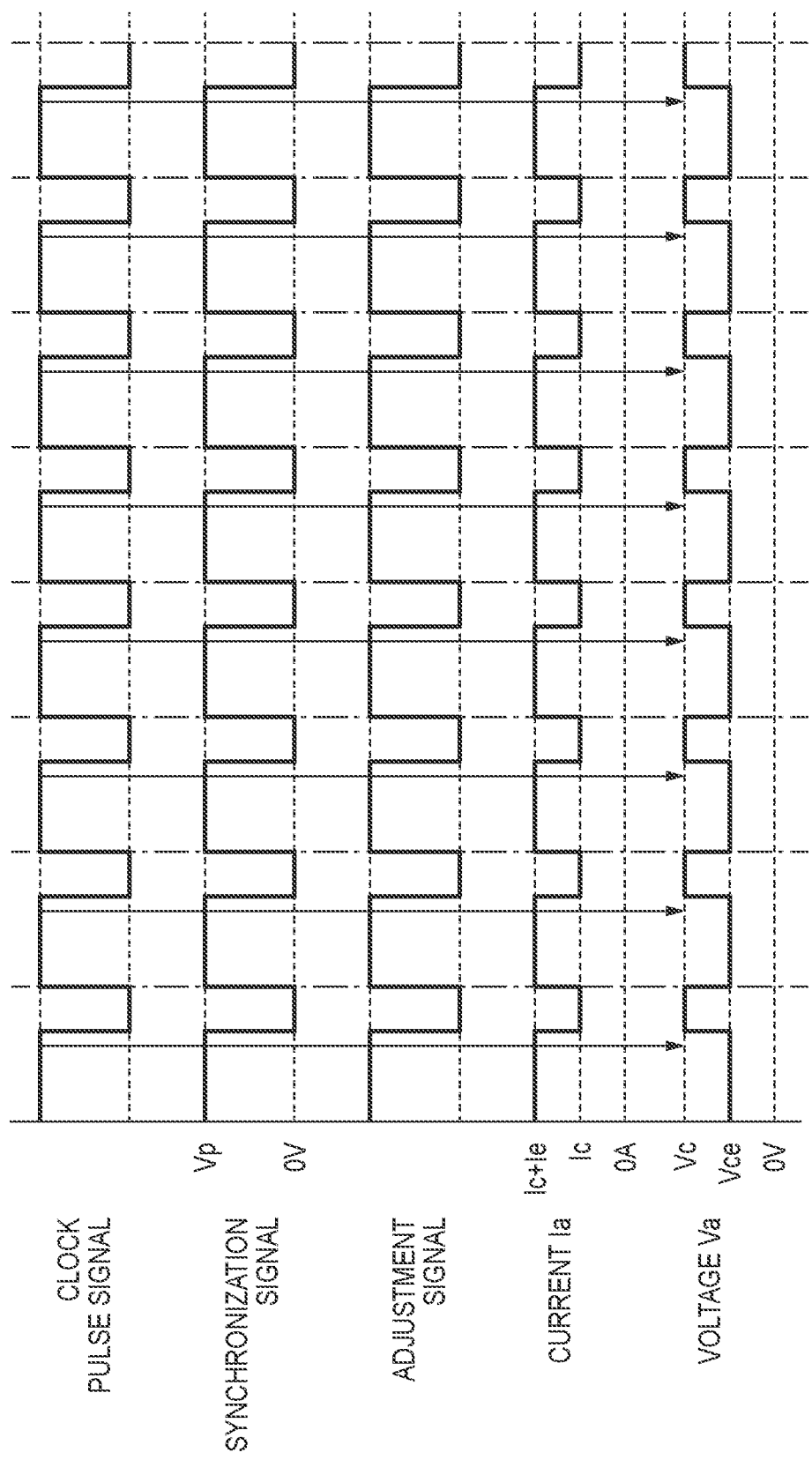

DATA CARRIER APPARATUS, DATA CARRIER DRIVE APPARATUS, DATA COMMUNICATION SYSTEM, IMAGE FORMING APPARATUS AND REPLACEMENT UNIT FOR THE SAME

BACKGROUND OF THE INVENTION

Field of the Invention

The present invention relates to a data communication technique between a data carrier apparatus and a data carrier drive apparatus.

Description of the Related Art

US 2006/0098691 A1 discloses a data communication system including a data carrier drive apparatus and a data carrier apparatus. According to US 2006/0098691 A1, the data carrier drive apparatus transmits data to the data carrier apparatus by changing a duty ratio of a pulse signal. Further, the data carrier apparatus transmits data to the data carrier drive apparatus by turning a constant current source on and off.

In a configuration disclosed in US 2006/0098691 A1, the current value when the data carrier apparatus turns on the constant current source, and the current value when the data carrier apparatus turns off the constant current source may change due to a temperature change during operation of the data communication system. Further, variations may occur in the current value when the constant current source is turned on and the current value when the constant current source is turned off due to variations in elements and circuits of individual data carrier apparatuses. The data carrier drive apparatus is required to accurately discriminate data from the data carrier apparatus regardless of the variations in the current value for individual data carrier apparatuses and changes in the current value during operation.

SUMMARY OF THE INVENTION

According to an aspect of the present disclosure, a data communication system includes a data carrier drive apparatus and a data carrier apparatus. The data carrier apparatus includes: an output unit configured to output transmission data to be transmitted to the data carrier drive apparatus during a first state and output adjustment data to be transmitted to the data carrier drive apparatus during a second state; and a current changer configured to change a current value of an inter-apparatus current flowing from the data carrier drive apparatus to the data carrier apparatus according to data values of the transmission data and the adjustment data. The data carrier drive apparatus includes: a detector configured to detect a detection value corresponding to the current value of the inter-apparatus current; a determiner configured to determine the data value of the transmission data by comparing the detection value detected by the detector with a threshold value during the first state; and an updater configured to update the threshold value based on the detection value detected by the detector during the second state.

Further features of the present invention will become apparent from the following description of exemplary embodiments with reference to the attached drawings.

BRIEF DESCRIPTION OF THE DRAWINGS

FIG. 12 is a diagram illustrating each signal waveform in an adjustment state according to an embodiment.

DESCRIPTION OF THE EMBODIMENTS

Figure 1:
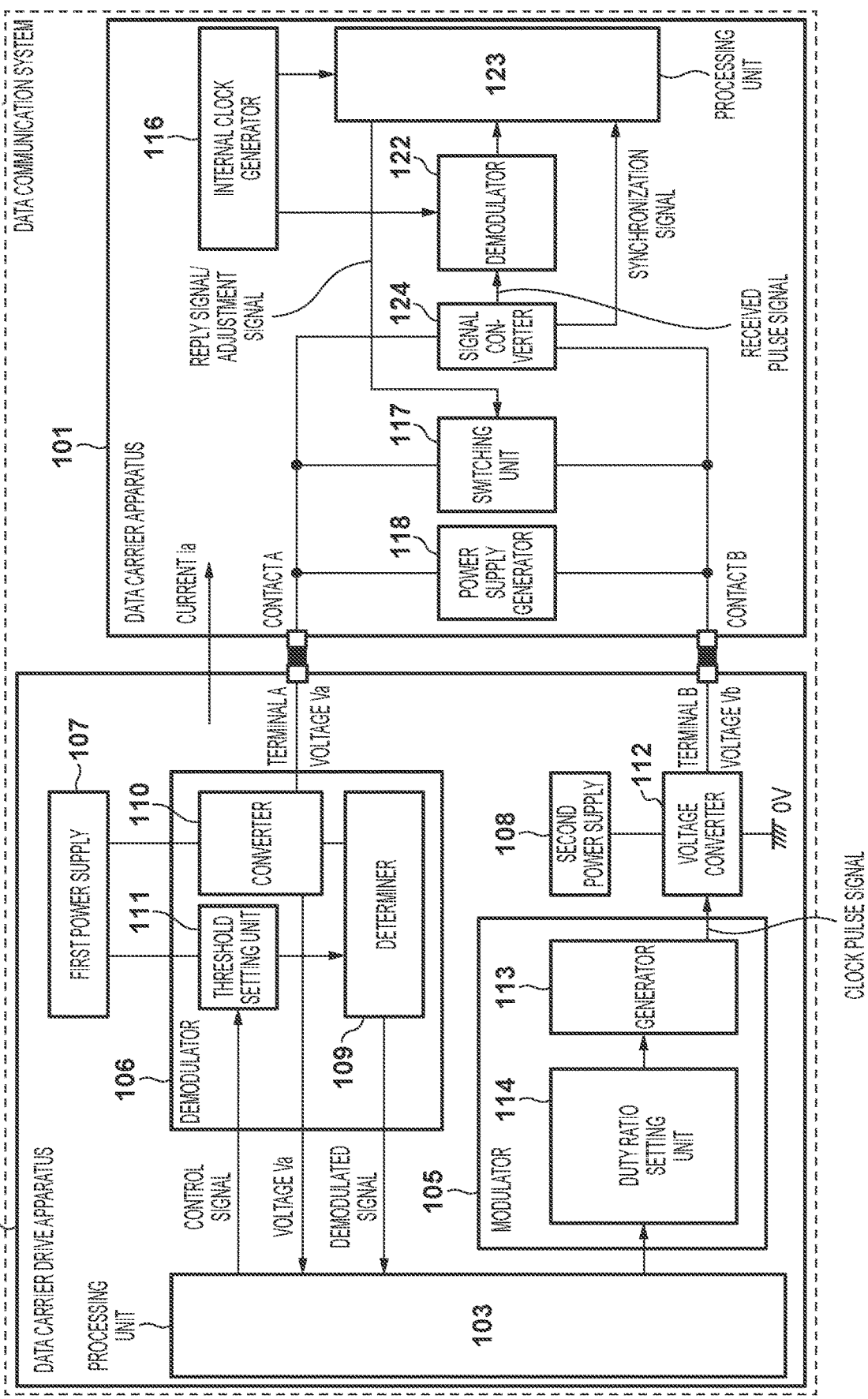
FIG. 1 is a configuration diagram of a data communication system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of a data communication system 100 according to the present embodiment. The data communication system 100 includes a data carrier drive apparatus 102 and a data carrier apparatus 101. The data carrier drive apparatus 102 has a terminal A and a terminal B, and the data carrier apparatus 101 has a contact A and a contact B. Here, as illustrated in FIG. 1, the terminal A and the contact A are connected by a communication line, the terminal B and the contact B are connected by a communication line, and the data carrier apparatus 101 and the data carrier drive apparatus 102 transmit and receive data through these two communication lines. Further, the data carrier drive apparatus 102 supplies operating power for the data carrier apparatus 101 to the data carrier apparatus 101 through the two communication lines.

For example, the data communication system 100 according to the present embodiment can be applied to an image forming apparatus. Specifically, the data carrier drive apparatus 102 is provided in a main body of the image forming apparatus, and the data carrier apparatus 101 is provided in a replacement unit for the image forming apparatus. Then, when the replacement unit is attached to the image forming apparatus, the image forming apparatus is configured so that the data carrier drive apparatus 102 and the data carrier apparatus 101 are connected by the two communication lines. Further, the data carrier apparatus 101 is provided with a memory (not shown) in which information regarding the replacement unit is stored. Thus, the image forming apparatus can acquire information about the replacement unit stored in the memory by using the data communication system 100. Note that the information stored in the memory can be, for example, information regarding authentication of the replacement unit or information regarding control parameters in image formation control performed using the replacement unit.

Figure 2:
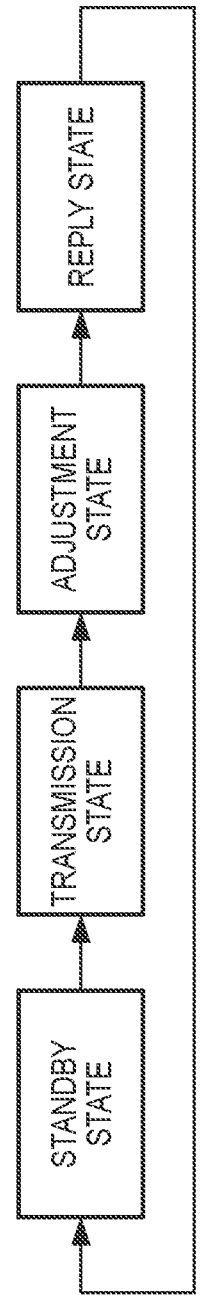
FIG. 2 is a transition diagram of a communication state according to an embodiment.

As illustrated in FIG. 2, the data communication system 100 according to the present embodiment transmits and receives data while transitioning between four states of a standby state, a transmission state, an adjustment state, and a reply state, which are communication states. Note that the transition order is the order illustrated in FIG. 2. The transmission state is a state in which the data carrier drive apparatus 102 transmits command data (transmission data) to the data carrier apparatus 101. For example, the data carrier drive apparatus 102 can use command data to instruct the data carrier apparatus 101 to read the data stored in the memory (not shown) of the data carrier apparatus 101. When the data carrier drive apparatus 102 completes transmission of the command data, it transits to the adjustment state.

The adjustment state is a state in which the data carrier apparatus 101 analyzes the command data received in the transmission state, performs processing according to the command data, and acquires or generates reply data (transmission data) to be returned to the data carrier drive apparatus 102 in the subsequent reply state. Note that the data carrier apparatus 101 transmits adjustment data (threshold determination data) to the data carrier drive apparatus 102 in the adjustment state. The adjustment data is data for enabling the data carrier drive apparatus 102 to correctly demodulate the data transmitted (returned) by the data carrier apparatus 101 to the data carrier drive apparatus 102 in the reply state following the adjustment state. In the reply state, the data carrier apparatus 101 transmits the reply data to the data carrier drive apparatus 102. For example, when the command received in the transmission state is to read data in the memory, the reply data includes values of the data stored in the memory. When the data carrier apparatus 101 completes the transmission of the reply data, it transits to the standby state. The standby state is a state in which data is not transmitted or received until the data carrier drive apparatus 102 transmits the next piece of command data to the data carrier apparatus 101.

First, the data carrier drive apparatus 102 shown in FIG. 1 will be described. A first power supply 107 of the data carrier drive apparatus 102 outputs a voltage value V1 to a demodulator 106. Further, a second power supply 108 outputs a voltage value V2 to a voltage converter 112. Note that the voltage value V2 is smaller than the voltage value V1. A processing unit or processor 103 creates command data, adjusts a threshold value that is based on the adjustment data received from the data carrier apparatus 101, performs processing that is based on the reply data received from the data carrier apparatus 101, and the like. Further, the processing unit 103 also manages the communication state.

A modulator 105 generates a clock pulse signal according to the command data generated by the processing unit 103. Specifically, a duty ratio setting unit 114 stores values indicating two duty ratios of a duty ratio A and a duty ratio B. In the present embodiment, it is assumed that a value indicating the duty ratio A having a duty ratio smaller than 50% and a value indicating the duty ratio B having a duty ratio larger than 50% are stored. The duty ratio setting unit 114 selects the duty ratio A or the duty ratio B according to a data value of the command data, and notifies a generator 113 of the selected duty ratio. The generator 113 generates a clock pulse signal according to the duty ratio from the duty ratio setting unit 114 and outputs it to the voltage converter 112. That is, the pulse of the clock pulse signal output by the generator 113 is one of the two pulses of the duty ratio A and the duty ratio B. Note that, in this example, it is assumed that the pulse of the duty ratio A indicates a bit value "0" and the pulse of the duty ratio B indicates a bit value "1".

Figure 3:
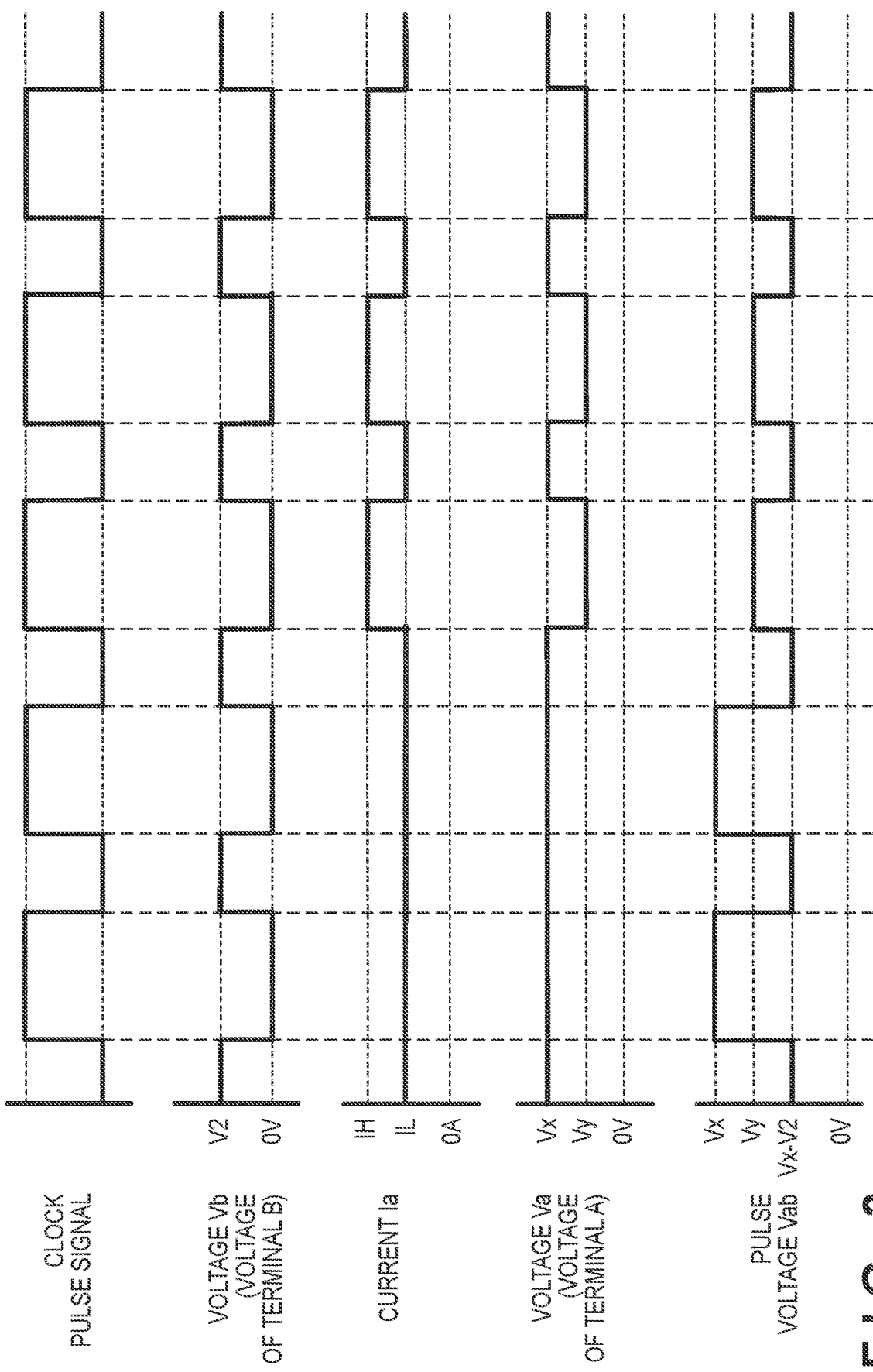
FIG. 3 is a diagram illustrating each signal waveform of a data carrier drive apparatus according to an embodiment.

The voltage converter 112 outputs the voltage value V2 output by the second power supply 108 to the terminal B while the input clock pulse signal is at a low level, and outputs 0V (GND) to the terminal B while the clock pulse signal is at a high level. Therefore, when the clock pulse signal input to the voltage converter 112 is as illustrated in FIG. 3, a waveform of a voltage Vb output by the voltage converter 112 to the terminal B is also as illustrated in FIG. 3.

Figure 4:
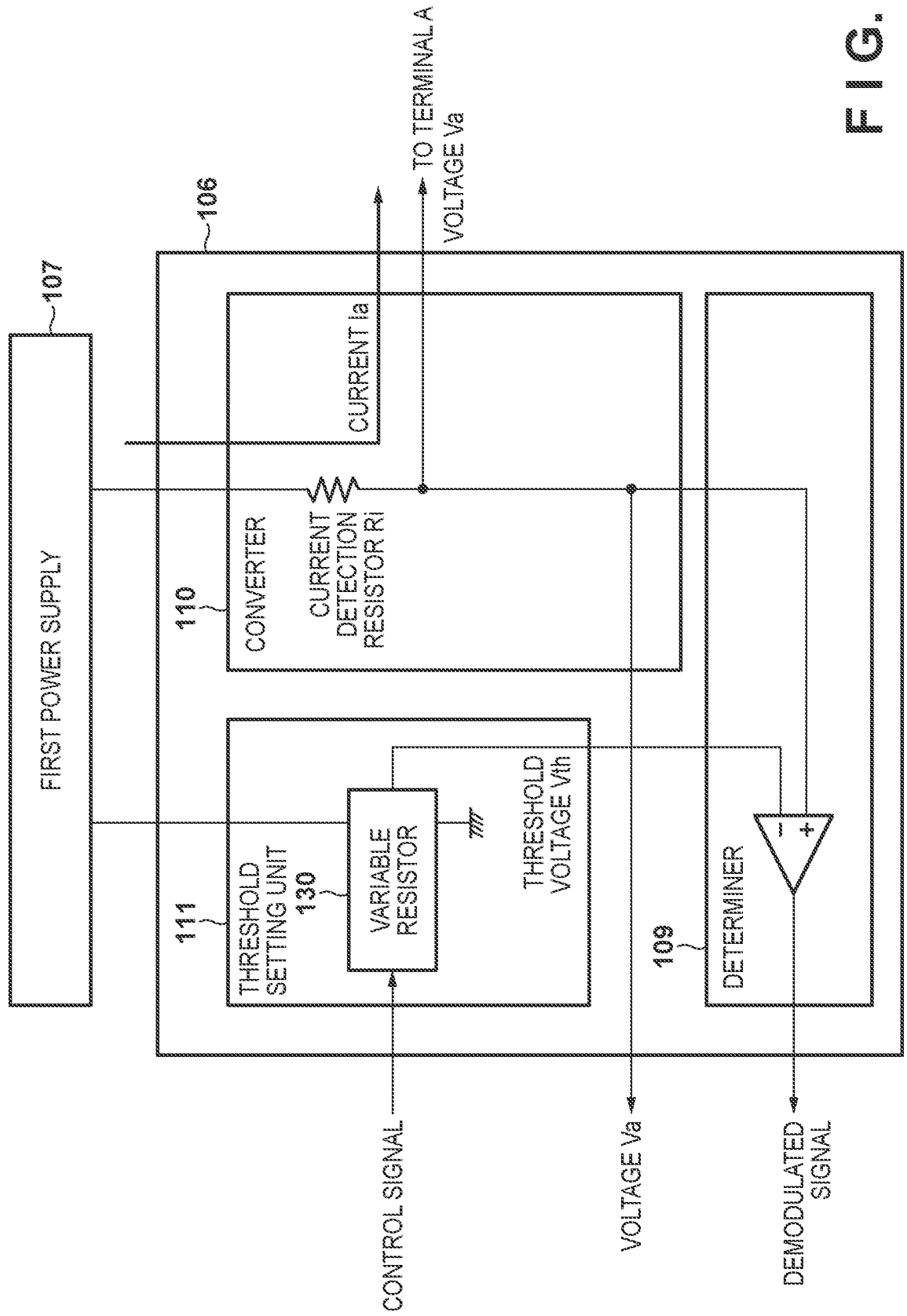
FIG. 4 is a configuration diagram of a demodulator of the data carrier drive apparatus according to an embodiment.

The demodulator 106 demodulates the reply data transmitted by the data carrier apparatus 101 and outputs a demodulated signal to the processing unit 103. FIG. 4 illustrates a detailed configuration of the demodulator 106. A converter 110 has a current detection resistor Ri, and the current detection resistor Ri converts an inter-apparatus current Ia (hereinafter, simply referred to as a current Ia) flowing from the first power supply 107 to the data carrier apparatus 101 into a voltage Va. Although details will be described below, the data carrier apparatus 101 changes the value of the current Ia according to the data value transmitted to the data carrier drive apparatus 102. In this example, when the data value transmitted to the data carrier drive apparatus 102 is "1", the value of the current Ia is increased as compared with the case where the data value is "0". The voltage Va is also a voltage of the contact A (terminal A) of the data carrier apparatus 101. Here, the voltage Va=V1−IH×Ri when Ia=IH (corresponding to the data value "1") is expressed as a voltage value Vy below, and the voltage Va=V1−IL×Ri when Ia=IL (corresponding to the data value "0")<IH is expressed as a voltage value Vx below. For example, when the current Ia changes as illustrated in FIG. 3, the voltage Va also changes as illustrated in FIG. 3. This voltage Va is input to an AD port of the processing unit 103 and a comparator of a determiner 109.

A threshold setting unit 111 has a variable resistor 130 including, for example, a digital potentiometer, and divides a voltage V1 output from the first power supply 107 based on a control signal input from the processing unit 103, to generate a threshold voltage Vth. The threshold voltage Vth from the threshold setting unit 111 and the voltage Va from the converter 110 are input to the comparator of the determiner 109. Here, the threshold voltage Vth is set to a value that is larger than the voltage value Vy that the voltage Va can take and smaller than the voltage value Vx. The comparator of the determiner 109 compares the threshold voltage Vth with the voltage Va, and outputs a comparison result as a demodulated signal to the processing unit 103. In this example, the comparator is to output the demodulated signal at the high level while the voltage Va is larger than the threshold voltage Vth, and output the demodulated signal at the low level while the voltage Va is smaller than the threshold voltage Vth. The processing unit 103 determines the data value of the reply data based on the demodulated signal. Note that, in this example, as described above, when the data value of the reply data is "1", the voltage Va is the voltage value Vy, and when the data value of the reply data is "0", the voltage Va is the voltage value Vx>the voltage value Vy. Therefore, when the data value of the reply data is "1", the demodulated signal is at the low level, and when the data value of the reply data is "0", the demodulated signal is at the high level. Therefore, the processing unit 103 determines that the data value of the reply data is "1" when the demodulated signal is at the low level, and determines that the data value of the reply data is "0" when the demodulated signal is at the high level.

As described above, the data carrier apparatus 101 transmits the adjustment data during the adjustment state. Further, the processing unit 103 detects the voltage Va that changes according to the adjustment data during the adjustment state, and determines a value of the threshold voltage Vth based on the detected value. Then, the processing unit 103 transmits the control signal to the variable resistor 130 in order to update the threshold voltage Vth to the determined value. Note that a method of determining the threshold voltage Vth will be described below. Then, during the reply state, the determiner 109 makes a comparison with the voltage Va using the value of the threshold voltage Vth determined during the previous adjustment state. In this way, the threshold value (threshold voltage Vth) used for data demodulation in the reply state is adjusted based on the adjustment data transmitted by the data carrier apparatus 101 to the data carrier drive apparatus 102 during the immediately preceding adjustment state.

When the voltage (voltage Vb) of the terminal B and the voltage (voltage Va) of the terminal A change as illustrated in FIG. 3, a pulse voltage Vab between the terminal A and the terminal B also changes as illustrated in FIG. 3. The pulse voltage Vab is also a voltage between the contact A and the contact B of the data carrier apparatus 101. That is, when the voltage (voltage Vb) of the terminal B and the voltage (voltage Va) of the terminal A change as illustrated in FIG. 3, the pulse voltage Vab illustrated in FIG. 3 is applied to the data carrier apparatus 101.

Next, each block of the data carrier apparatus 101 will be described. A power supply generator 118 generates a voltage Vp used by the data carrier apparatus 101 by smoothing the pulse voltage Vab applied from the data carrier drive apparatus 102. The voltage Vp is supplied to each part of the data carrier apparatus 101. A signal converter 124 converts the pulse voltage Vab into a value that can be used in the data carrier apparatus 101. In the present embodiment, the signal converter 124 converts the pulse voltage Vab into the voltage Vp when the pulse voltage Vab is at the high level (voltage value Vx or voltage value Vy), and converts the pulse voltage Vab into a reference voltage lower than the voltage Vp when the pulse voltage Vab is at the low level (voltage value (Vx−V2)). In the present embodiment, the reference voltage is set to 0V. The signal converter 124 outputs the converted signal to a demodulator 122 as a received pulse signal and outputs the converted signal to a processing unit 123 as a synchronization signal. An internal clock generator 116 generates an internal clock having a frequency sufficiently higher than that of the pulse voltage Vab and outputs the internal clock to the demodulator 122 and the processing unit 123.

Figure 5:
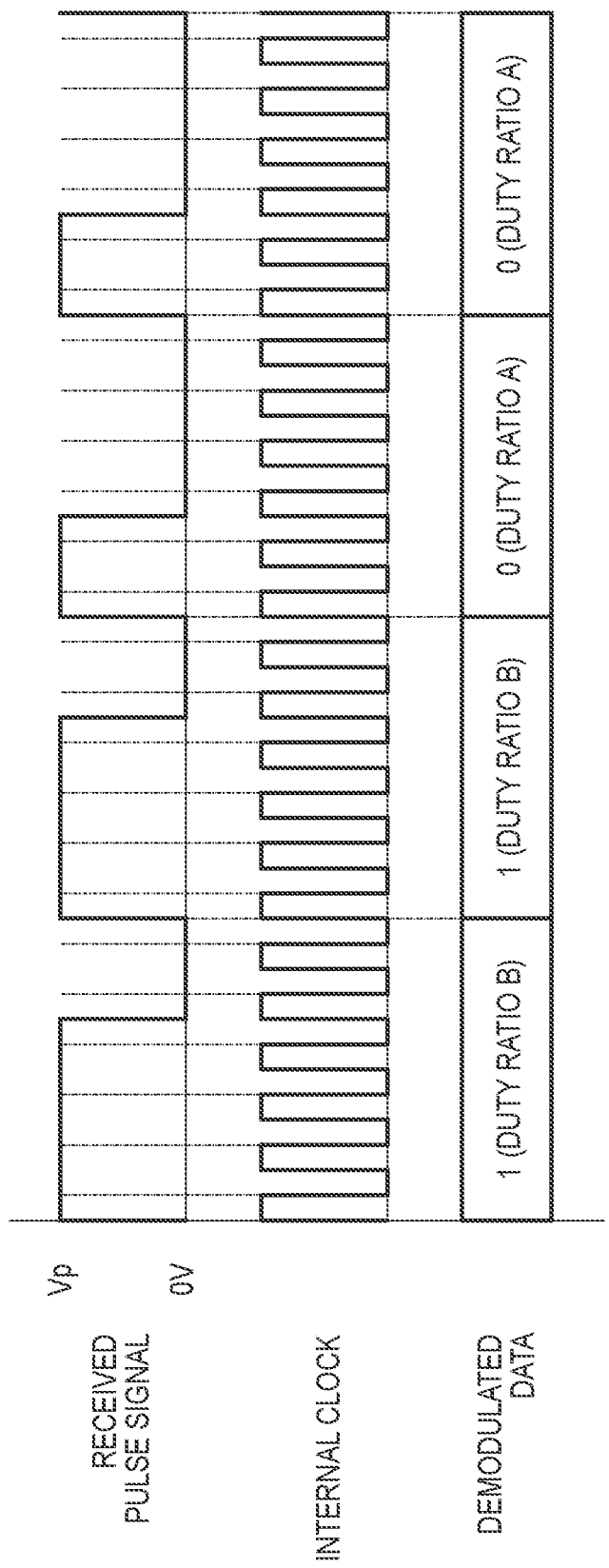
FIG. 5 is an explanatory diagram of a demodulation process of the data carrier apparatus according to an embodiment.

The demodulator 122 determines the duty ratio of the received pulse signal in the transmission state, determines (demodulates) the data value of the command data based on this determined result, and outputs the determined data value to the processing unit 123. For example, when the received pulse signal illustrated in FIG. 5 is input to the demodulator 122, the demodulator 122 counts a high level period and a low level period within one pulse period of the received pulse signal at a falling edge of the internal clock. Then, the demodulator 122 determines that the data value of the command data is "1" (duty ratio B) if the high level period is longer than the low level period, and if not, determines that the data value of the command data is "0" (duty ratio A).

The processing unit 123 manages the communication state. The processing unit 123 receives command data from the data carrier drive apparatus 102 during the transmission state, and generates reply data during the adjustment state. Then, the processing unit 123 outputs a reply signal corresponding to the reply data to a switching unit 117 during the reply state. Further, the processing unit 123 outputs an adjustment signal corresponding to the adjustment data to the switching unit 117 during the adjustment state. Further, the processing unit 123 monitors the transmission of the command data by the data carrier drive apparatus 102 during the standby state. In the present embodiment, signals output by the processing unit 123 are referred to as a reply signal and an adjustment signal in order to distinguish them from the reply data and the adjustment data transmitted to the data carrier drive apparatus 102. However, the reply signal output by the processing unit 123 can be called reply data (transmission data), and the adjustment signal can also be called adjustment data.

Figure 6:
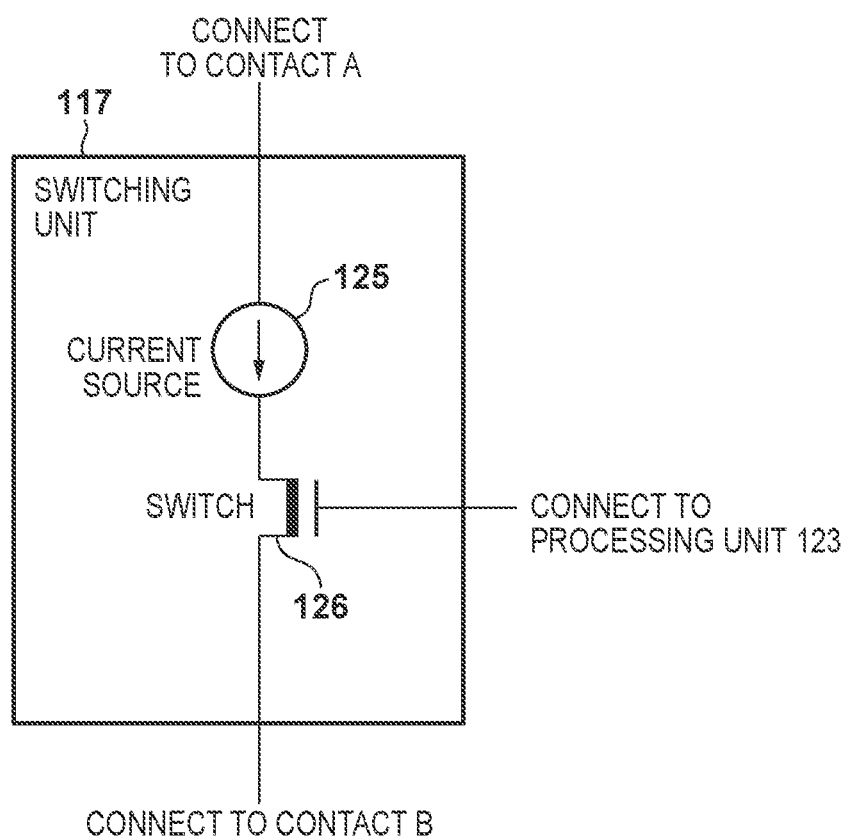
FIG. 6 is a configuration diagram of a switching unit according to an embodiment.
Figure 7:
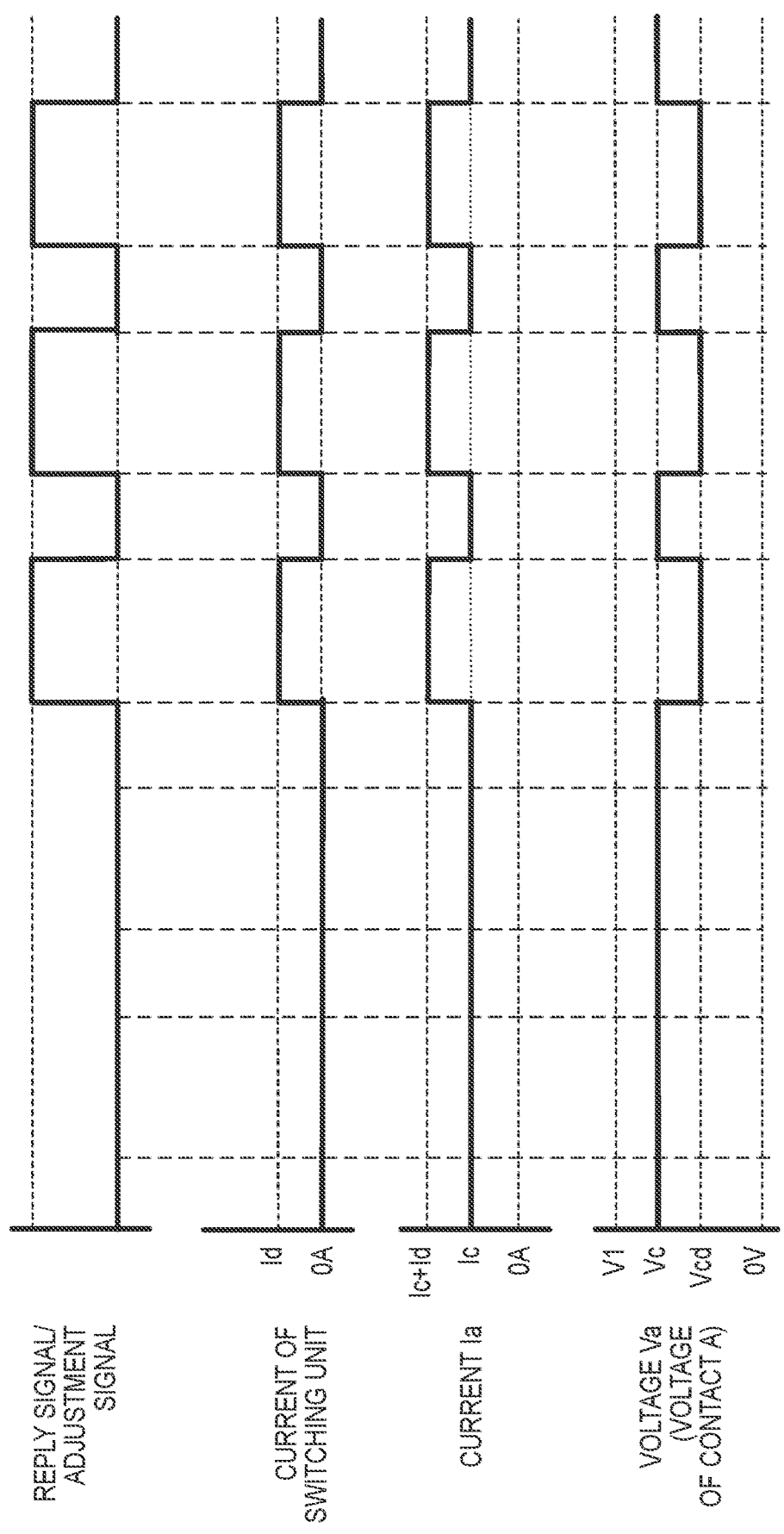
FIG. 7 is a diagram illustrating each signal waveform of the data carrier apparatus according to an embodiment.

The switching unit 117 transmits the reply data and the adjustment data to the data carrier drive apparatus 102 by controlling the current Ia flowing from the data carrier drive apparatus 102 to the data carrier apparatus 101 based on the reply signal and the adjustment signal. In this way, the switching unit 117 functions as a current changer that changes the current Ia according to the data value of the data transmitted to the data carrier drive apparatus 102. In this example, when the data values of the reply data and the adjustment data are "0", the reply signal and the adjustment signal are set to the low level. On the other hand, when the data values of the reply data and the adjustment data are "1", the reply signal and the adjustment signal are set to the high level for a predetermined period. FIG. 6 is a configuration diagram of the switching unit 117. A switch 126 includes a switch element such as an FET, and is turned on/off according to the reply signal and the adjustment signal output from the processing unit 123. In this example, it is assumed that the switch 126 is in an ON state while the reply signal and the adjustment signal are at the high level, and the switch 126 is in an OFF state while the reply signal and the adjustment signal are at the low level. While the switch 126 is in the ON state, a current of a current value Id flows from a current source 125 to the switching unit 117. On the other hand, while the switch 126 is in the OFF state, no current flows through the switching unit 117. For example, when the reply signal or the adjustment signal changes as illustrated in FIG. 7, the current flowing through the switching unit 117 also changes as illustrated in FIG. 7. Here, when the total current value of the currents flowing through functional blocks other than the switching unit 117 of the data carrier apparatus 101 is Ic, the current Ia also changes as illustrated in FIG. 7. Therefore, the voltage Va also changes as illustrated in FIG. 7. Here, a voltage value Vc=V1−Ri×Ic, and a voltage value Vcd=V1−Ri×(Ic+Id). Note that the voltage value Vc corresponds to the voltage value Vx in FIG. 3, and the voltage value Vcd corresponds to the voltage value Vy in FIG. 3.

Figure 8:
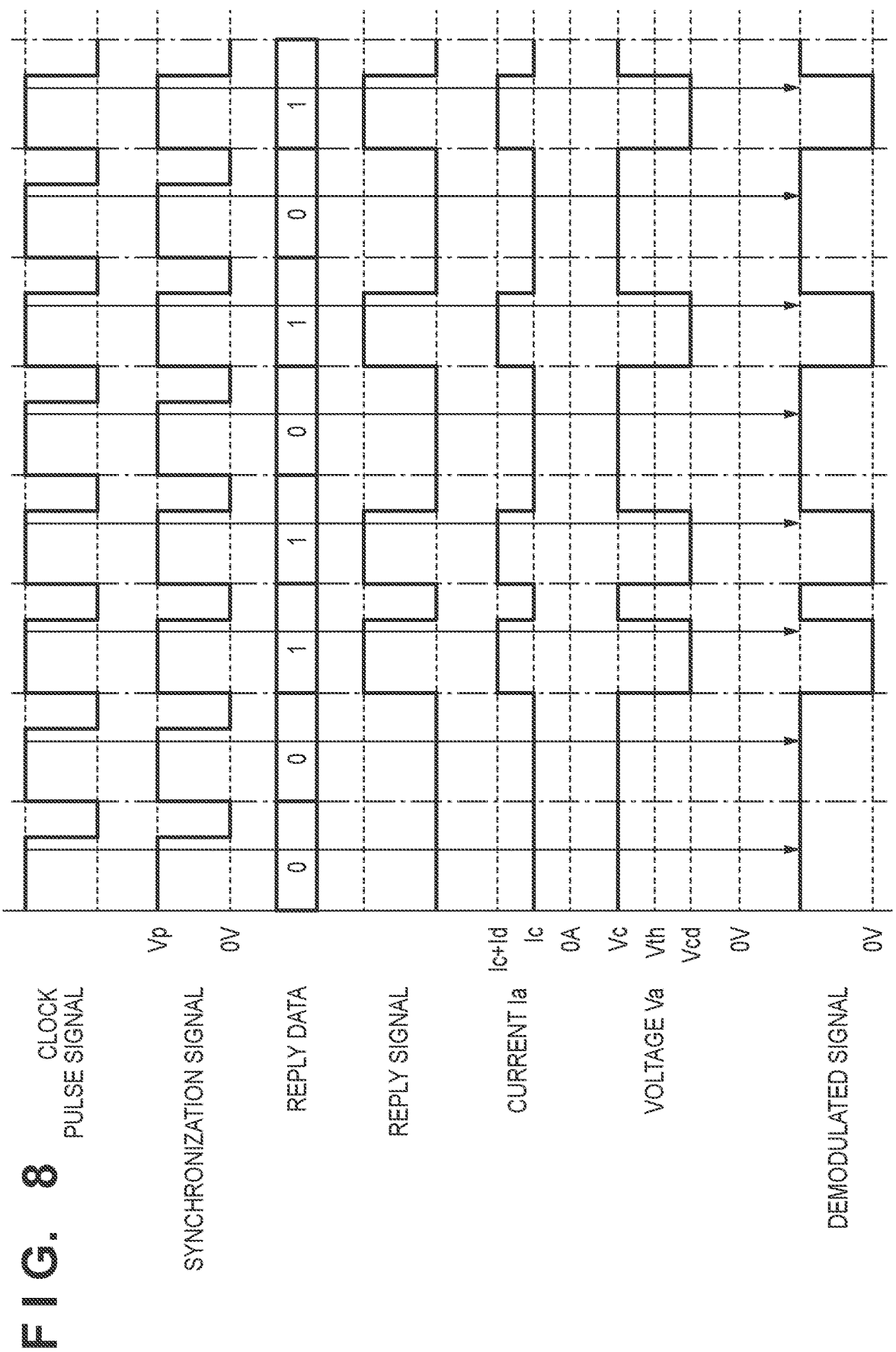
FIG. 8 is a diagram illustrating each signal waveform in a reply state according to an embodiment.

FIG. 8 illustrates time change of each signal in the reply state. The modulator 105 of the data carrier drive apparatus 102 continues to output the clock pulse signal of the duty ratio B (corresponding to the data value "1") during a state different from the transmission state. This is to maintain synchronization between the data carrier drive apparatus 102 and the data carrier apparatus 101. Since a waveform of the synchronization signal output by the signal converter 124 to the processing unit 123 is the same as the clock pulse signal, it is as illustrated in FIG. 8. However, the high level and low level voltage values of the synchronization signal are different from the clock pulse signal. For example, as illustrated in FIG. 8, it is assumed that the reply data is "00110101". As described above, the processing unit 123 sets the reply signal at the low level when the data value of the reply data is "0". On the other hand, when the data value is "1", the processing unit 123 generates a reply signal that is at the high level while the synchronization signal is at the high level and that is at the low level while the synchronization signal is at the low level. Therefore, the reply signal output by the processing unit 123 is as illustrated in FIG. 8.

As described above, since the switch 126 of the switching unit 117 is in the ON state while the reply signal is at the high level, and the switch 126 of the switching unit 117 is in the OFF state while the reply signal is at the low level, the current Ia and the voltage Va change as illustrated in FIG. 8. As described above, since the threshold voltage Vth is set to be between the voltage value Vx=Vc and the voltage value Vy=Vcd, the demodulated signal output by the determiner 109 is as illustrated in FIG. 8. The processing unit 103 detects the level of the demodulated signal at a timing slightly before the falling edge of the clock pulse signal (a timing indicated by an arrow in FIG. 8), and determines that the data value is "0" if the level is the high level, and determines that the data value is "1" if the level is the low level. In this example, when the reply data is "1", the pulse waveform of the reply signal is the same as the pulse waveform of the synchronization signal, but it can also be configured to keep the reply signal at the high level for a period of 1 bit when the reply data is "1".

Figure 9:
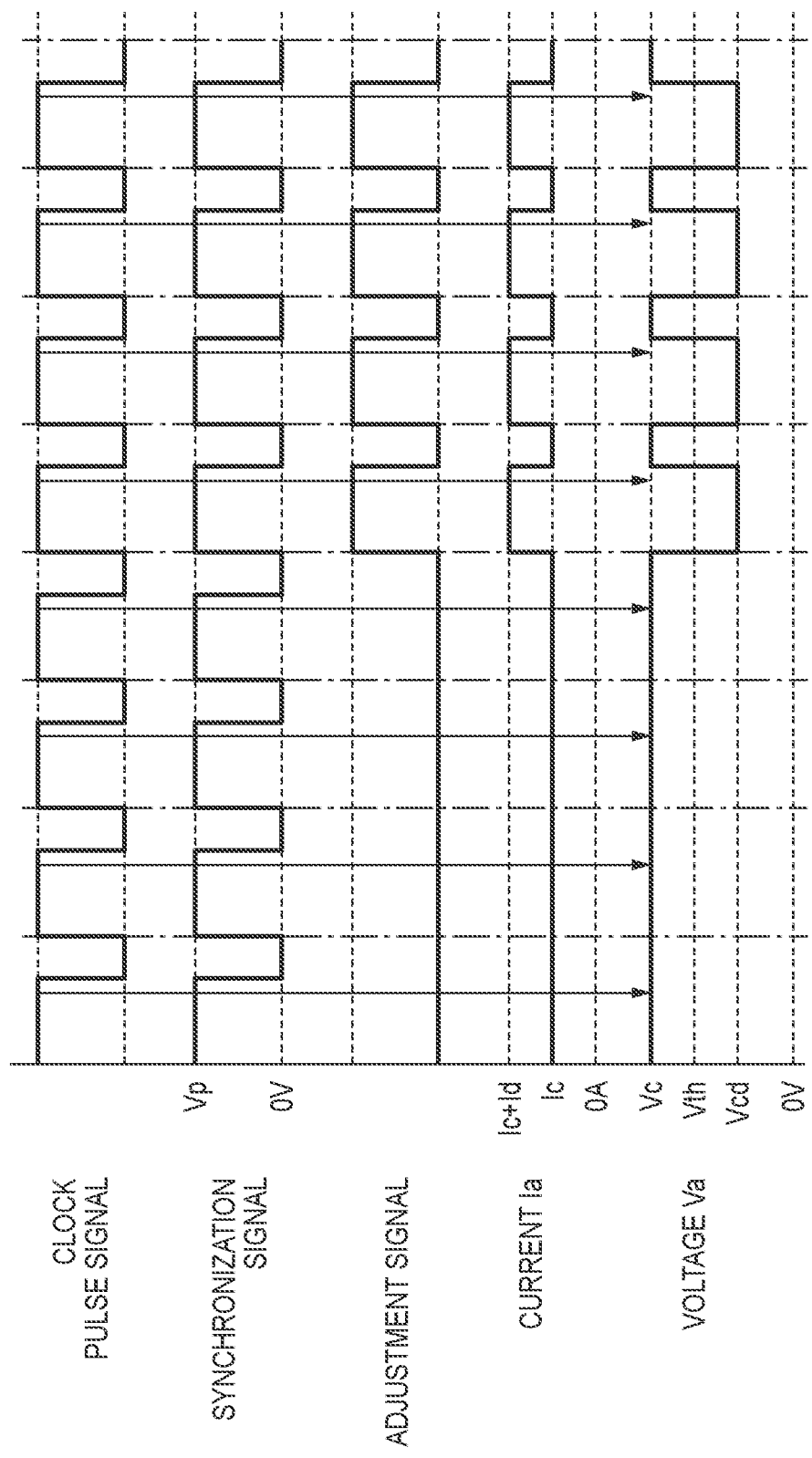
FIG. 9 is a diagram illustrating each signal waveform in an adjustment state according to an embodiment.

Subsequently, a process of determining the threshold voltage Vth performed during the adjustment state will be described. Note that, in the following, it is assumed that a period of the adjustment state is 8 cycles in the pulse cycle of the clock pulse signal. During the adjustment state, the modulator 105 of the data carrier drive apparatus 102 outputs the clock pulse signal illustrated in FIG. 9, and thus the signal converter 124 outputs the synchronization signal illustrated in FIG. 9 to the processing unit 123. The processing unit 123 sets the data value of the adjustment data to "0" in the first half period of the adjustment state, and sets the data value of the adjustment data to "1" in the second half period. Therefore, the processing unit 123 outputs the adjustment signal illustrated in FIG. 9. Accordingly, the current Ia and the voltage Va also change as illustrated in FIG. 9.

The processing unit 103 of the data carrier drive apparatus 102 acquires the voltage Va from the converter 110. Then, the processing unit 103 determines the voltage value of the voltage Va at the same timing (a timing indicated by an arrow in FIG. 9) as when the reply data is determined. In this example, "0" is transmitted four times (4 bits) and "1" is transmitted four times as the data value of the adjustment data. Therefore, the processing unit 103 detects the voltage value of the voltage Va when the data value is "0" and the voltage value of the voltage Va when the data value is "1" four times, respectively. The processing unit 103 obtains an average value Ac of the voltage values of the voltage Va when the data value is "0" and an average value Acd of the voltage values of the voltage Va when the data value is "1", and determines the threshold voltage Vth as a value smaller than the average value Ac and larger than the average value Acd. For example, the processing unit 103 can determine the threshold voltage Vth as an average value (intermediate value) of the average value Ac and the average value Acd.

In the present embodiment, the period of the adjustment state is set to 8 cycles of the clock pulse signal, the data value of the adjustment data is set to "0" in its first half period, and the data value of the adjustment data is set to "1" in the second half period. However, a period in which the data value of the adjustment data is set to "0" and a period in which the data value of the adjustment data is set to "1" are arbitrary. Further, the period in which the data value of the adjustment data is set to "0" and the period in which the data value of the adjustment data is set to "1" may differ from each other. Further, one of the data values "0" and "1" is continuously transmitted at the beginning of the adjustment state, and the other data value is continuously transmitted in the remaining period, but the present invention is not limited to such data pattern. That is, the data pattern of the adjustment data in the present embodiment is "00001111". However, if the data pattern of the adjustment data is known between the data carrier apparatus 101 and the data carrier drive apparatus 102, any data pattern can be used as the adjustment data.

As described above, the data carrier drive apparatus 102 adjusts the threshold value based on the known adjustment data transmitted by the data carrier apparatus 101 during the adjustment state. With this configuration, the data carrier drive apparatus 102 can accurately demodulate the reply data regardless of variations in the current Ia due to individual differences of the data carrier apparatus 101 and changes in the current Ia due to a temperature change. In the present embodiment, the threshold value is adjusted each time the adjustment state is entered, but the threshold value may also be adjusted each time the number of times the adjustment state is entered reaches a predetermined value.

Second Embodiment

Figure 10:
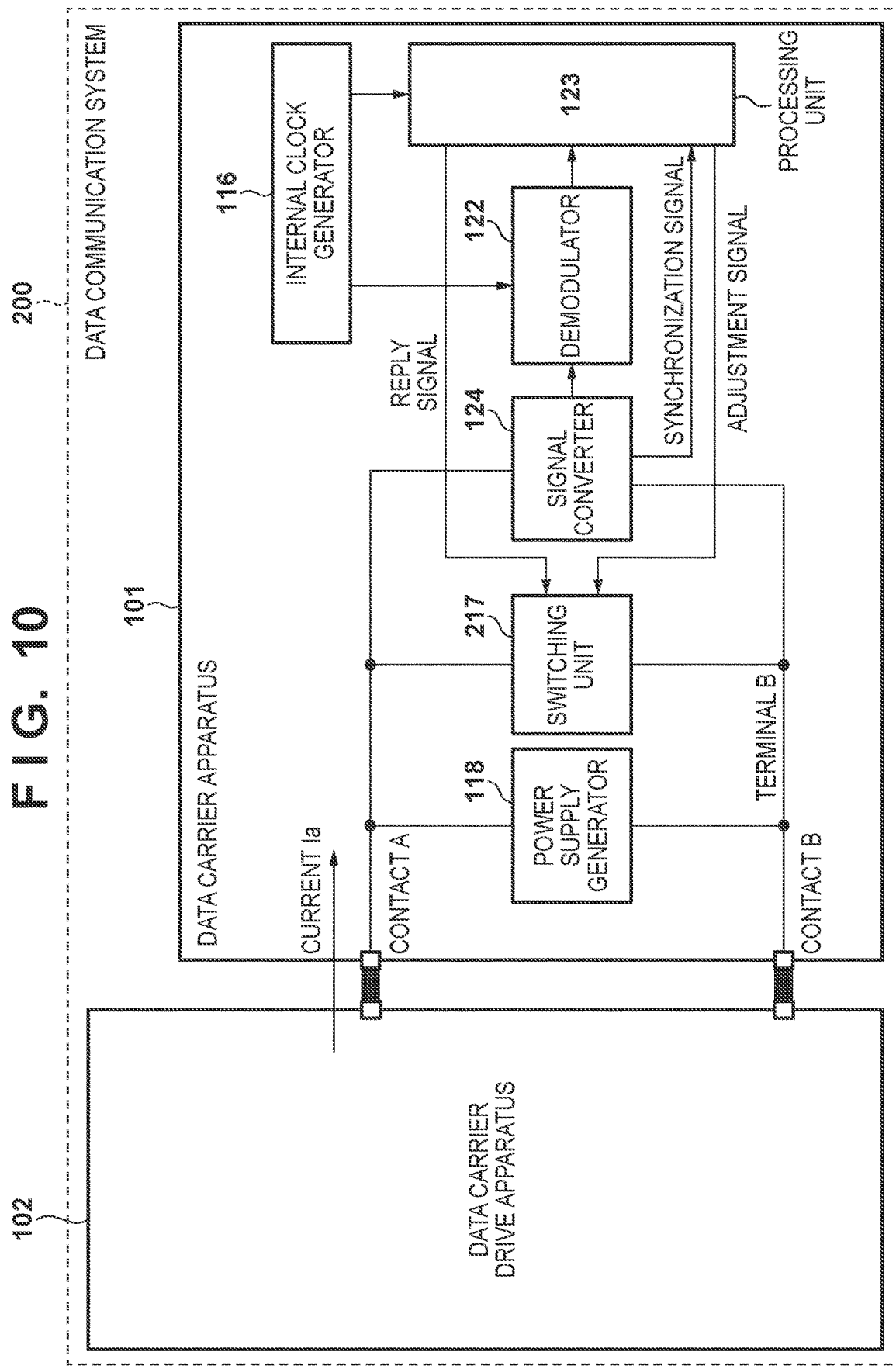
FIG. 10 is a configuration diagram of a data communication system according to an embodiment.

Next, a second embodiment will be described focusing on differences from a first embodiment. FIG. 10 is a configuration diagram of a data communication system 200 according to the present embodiment. Note that, of components of the data communication system 200, the same components as those described in the first embodiment (FIG. 1) are denoted by the same reference numerals, and a description thereof will be basically omitted. In the present embodiment, a switching unit 217 is provided in place of the switching unit 117 of the first embodiment (FIG. 1).

Figure 11:
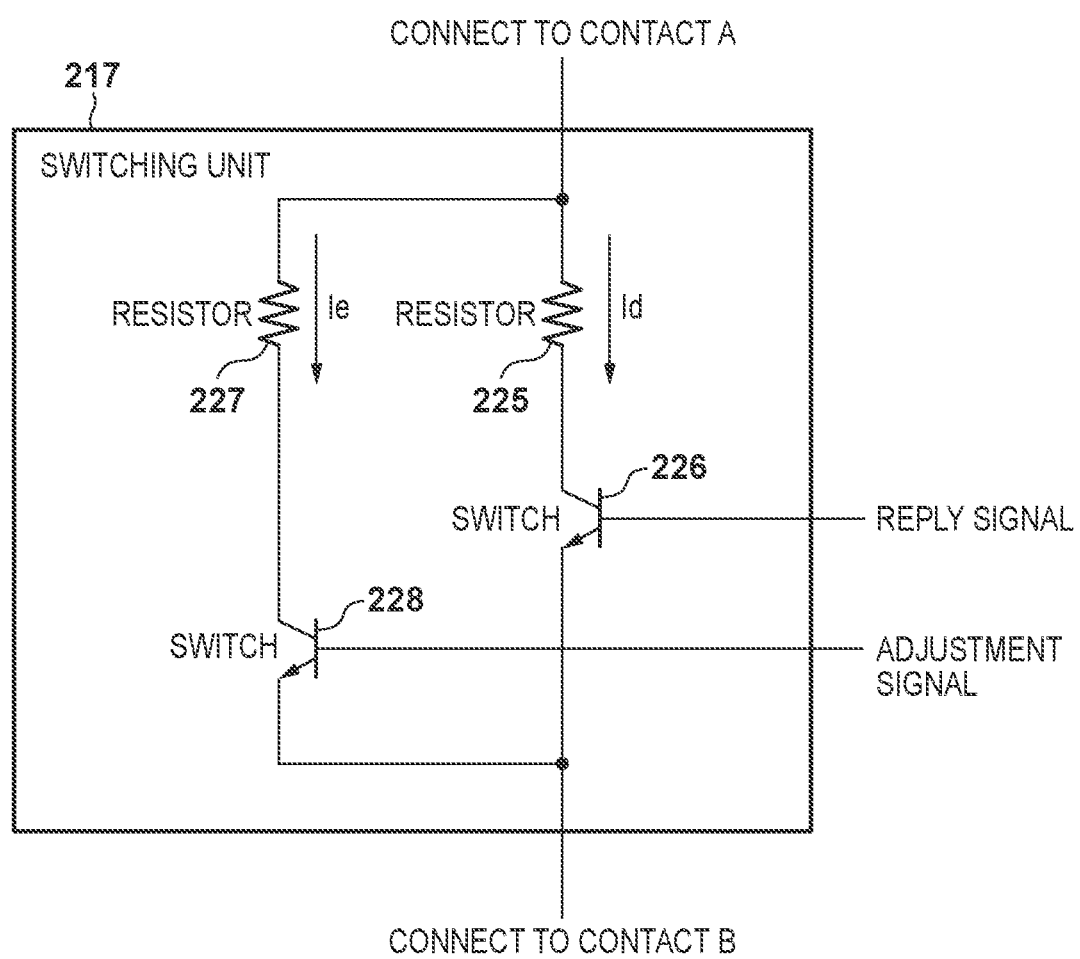
FIG. 11 is a configuration diagram of a switching unit according to an embodiment.

FIG. 11 is a configuration diagram of the switching unit 217. The switches 226 and 228 are switch elements such as bipolar transistors. The switch 226 is turned on/off according to the reply signal from the processing unit 123. Note that the switch 226 is turned on when the reply signal is at the high level, and the current of the current value Id flows through the switch 226 and a resistor 225. On the other hand, the switch 226 is turned off when the reply signal is at the low level, and no current flows through a series connection configuration portion of the switch 226 and the resistor 225. Similarly, the switch 228 is turned on/off according to the adjustment signal from the processing unit 123. The switch 228 is turned on when the adjustment signal is at the high level, and a current of a current value Ie flows through the switch 228 and a resistor 227. On the other hand, the switch 228 is turned off when the adjustment signal is at the low level, and no current flows through a series connection configuration portion of the switch 228 and the resistor 227. Note that the reply signal is set to the low level during the adjustment state, and the adjustment signal is set to the low level during the reply state.

Therefore, during the reply state, if the reply data is "1" (the reply signal is at the high level), the current value Id flows through the switching unit 217, and if the reply data is "0" (the reply signal is at the low level), no current flows through the switching unit 217. That is, an operation during the reply state is the same as that of the first embodiment. On the other hand, during the adjustment state, if the adjustment data is "1" (the adjustment signal is at the high level), the current value Ie flows through the switching unit 217, and if the adjustment data is "0" (the adjustment signal is at the low level), no current flows through the switching unit 217. Here, in the present embodiment, resistance values of the resistor 225 and the resistor 227 are set so that the current value Ie is half the current value Id.

FIG. 12 illustrates a time change of each signal in the adjustment state. In the first embodiment, the adjustment data has at least one data value "0" and at least one data value "1". In the present embodiment, the adjustment data is a continuous pattern of the data value "1". Therefore, during switching states, the current Ia is a current value (Ic+Ie) while the synchronization signal is at the high level, and is a current value Ic while the synchronization signal is at the low level. Similar to the first embodiment, the processing unit 103 of the data carrier apparatus acquires the voltage value of the voltage Va at the timing before the falling edge of the clock pulse signal. That is, the processing unit 103 acquires a voltage value Vce of the voltage Va when the current value of the current Ia is Ic+Ie. Here, Vce is Vce=V1−Ri×(Ic+Ie)=V1−Ri×(Ic+Id/2). The voltage value Vce is an intermediate value between the voltage value Vc and the voltage value Vcd in the reply state. Therefore, the processing unit 103 determines an average value of the voltage value Vce acquired at each timing as the value of the threshold voltage Vth, and outputs the control signal to the threshold setting unit 111 so as to be the determined threshold voltage Vth.

As described above, the data carrier drive apparatus 102 adjusts the threshold value based on the known adjustment data transmitted by the data carrier apparatus 101 during the adjustment state. With this configuration, the data carrier drive apparatus 102 can accurately demodulate the reply data regardless of variations in the current Ia due to individual differences of the data carrier apparatus 101 and changes in the current Ia due to temperature changes. In the present embodiment, the threshold value is adjusted each time the adjustment state is entered, but the threshold value may be adjusted each time the number of times the adjustment state is entered reaches the predetermined value. Further, in the present embodiment, the current value Ie is set to half the current value Id, but the current value Ie only has to be larger than 0 and smaller than the current value Id. Further, in the present embodiment, the adjustment data is the continuous pattern of the data value "1". However, the data pattern of the adjustment data only has to include at least one data value "1". The data carrier drive apparatus 102 determines the threshold value based on the voltage value of the voltage Va when the data value is "1".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-022668, filed Feb. 13, 2020, which is hereby incorporated by reference herein in its entirety.

What is claimed is:

1. A data communication system comprising a data carrier drive apparatus and a data carrier apparatus,
    wherein the data carrier apparatus comprises:
    a first processor configured to output transmission data to be transmitted to the data carrier drive apparatus while a communication state of the data communication system is in a first state and output adjustment data to be transmitted to the data carrier drive apparatus while the communication state is in a second state different from the first state; and
    a current changer configured to change a current value of an inter-apparatus current flowing from the data carrier drive apparatus to the data carrier apparatus according to data values of the transmission data and the adjustment data, and
    wherein the data carrier drive apparatus comprises:
    a detector configured to detect a detection value corresponding to the current value of the inter-apparatus current;
    a determiner configured to determine the data value of the transmission data by comparing the detection value detected by the detector with a threshold value during the first state; and
    a second processor configured to update the threshold value based on the detection value detected by the detector during the second state.

2. The data communication system according to claim 1, wherein the current changer is further configured to change the current value of the inter-apparatus current when the data value of the transmission data is a first data value, by a first current value from the current value of the inter-apparatus current when the data value of the transmission data is a second data value, and to change the current value of the inter-apparatus current when the data value of the adjustment data is the first data value, by the first current value from the current value of the inter-apparatus current when the data value of the adjustment data is the second data value, and a data pattern of the adjustment data includes at least one of the first data values and at least one of the second data values.

3. The data communication system according to claim 2, wherein the current changer is further configured to increase the inter-apparatus current by passing a current of the first current value when the data values of the transmission data and the adjustment data are the first data values, and not to pass the current of the first current value when the data values of the transmission data and the adjustment data are the second data values.

4. The data communication system according to claim 2, wherein the second processor is further configured to update the threshold value based on a first detection value of the detector when the data value of the adjustment data is the first data value, and a second detection value of the detector when the data value of the adjustment data is the second data value.

5. The data communication system according to claim 4, wherein the second processor is further configured to update the threshold value to a value that is between the first detection value and the second detection value and is different from the first detection value and the second detection value.

6. The data communication system according to claim 5, wherein the second processor is further configured to update the threshold value to an intermediate value between the first detection value and the second detection value.

7. The data communication system according to claim 1, wherein the current changer is further configured to
change the current value of the inter-apparatus current when the data value of the transmission data is a first data value, by a first current value from the current value of the inter-apparatus current when the data value of the transmission data is a second data value, and to change the current value of the inter-apparatus current when the data value of the adjustment data is the first data value, by a second current value from the current value of the inter-apparatus current when the data value of the adjustment data is the second data value,
the second current value is smaller than the first current value, and
a data pattern of the adjustment data includes at least one of the first data values.

8. The data communication system according to claim 7, wherein the second current value is half the first current value.

9. The data communication system according to claim 7, wherein the data pattern of the adjustment data is a pattern in which the first data values are continuous.

10. The data communication system according to claim 7, wherein the current changer is further configured to increase the inter-apparatus current by passing a current of the first current value when the data value of the transmission data is the first data value, not to pass the current of the first current value when the data value of the transmission data is the second data value, to increase the inter-apparatus current by passing a current of the second current value when the data value of the adjustment data is the first data value, and not to pass the current of the second current value when the data value of the adjustment data is the second data value.

11. The data communication system according to claim 10, wherein the updater is further configured to update the threshold value based on a first detection value of the detector when the data value of the adjustment data is the first data value.

12. The data communication system according to claim 1, wherein the first state is a state following the second state.

13. A data carrier apparatus that communicates with a data carrier drive apparatus, comprising:
a processor configured to output transmission data to be transmitted to the data carrier drive apparatus while a communication state between the data carrier apparatus and the data carrier drive apparatus is in a first state and output adjustment data to be transmitted to the data carrier drive apparatus while the communication state is in a second state different from the first state; and
a current changer configured to change a current value of an inter-apparatus current flowing from the data carrier drive apparatus to the data carrier apparatus according to data values of the transmission data and the adjustment data,
wherein the adjustment data is data for determining a threshold value used by the data carrier drive apparatus to determine the data value of the transmission data during the first state.

14. The data carrier apparatus according to claim 13,
wherein the current changer is further configured to change the current value of the inter-apparatus current when the data value of the transmission data is a first data value, by a first current value from the current value of the inter-apparatus current when the data value of the transmission data is a second data value, and to change the current value of the inter-apparatus current when the data value of the adjustment data is the first data value, by the first current value from the current value of the inter-apparatus current when the data value of the adjustment data is the second data value, and
a data pattern of the adjustment data includes at least one of the first data values and at least one of the second data values.

15. The data carrier apparatus according to claim 14, wherein the current changer is further configured to increase the inter-apparatus current by passing a current of the first current value when the data values of the transmission data and the adjustment data are the first data values, and not to pass the current of the first current value when the data values of the transmission data and the adjustment data are the second data values.

16. The data carrier apparatus according to claim 13,
wherein the current changer is further configured to change the current value of the inter-apparatus current when the data value of the transmission data is a first data value, by a first current value from the current value of the inter-apparatus current when the data value of the transmission data is a second data value, and to change the current value of the inter-apparatus current when the data value of the adjustment data is the first data value, by a second current value from the current value of the inter-apparatus current when the data value of the adjustment data is the second data value,
the second current value is smaller than the first current value, and
a data pattern of the adjustment data includes at least one of the first data values.

17. The data carrier apparatus according to claim 16, wherein the data pattern of the adjustment data is a pattern in which the first data values are continuous.

18. The data carrier apparatus according to claim 16, wherein the current changer is further configured to increase the inter-apparatus current by passing a current of the first current value when the data value of the transmission data is the first data value, not to pass the current of the first current value when the data value of the transmission data is the second data value, to increase the inter-apparatus current by passing a current of the second current value when the data value of the adjustment data is the first data value, and not to pass the current of the second current value when the data value of the adjustment data is the second data value.

19. A replacement unit for an image forming apparatus, comprising a data carrier apparatus that communicates with a data carrier drive apparatus of the image forming apparatus,
wherein the data carrier apparatus comprises:
a processor configured to output transmission data to be transmitted to the data carrier drive apparatus while a communication state between the data carrier apparatus and the data carrier drive apparatus is in a first state and output adjustment data to be transmitted to the data carrier drive apparatus while the communication state is in a second state different from the first state; and
a current changer configured to change a current value of an inter-apparatus current flowing from the data carrier drive apparatus to the data carrier apparatus according to data values of the transmission data and the adjustment data,
wherein the adjustment data is data for determining a threshold value used by the data carrier drive apparatus to determine the data value of the transmission data during the first state.

20. An image forming apparatus comprising a data carrier drive apparatus that communicates with a data carrier apparatus provided in a replacement unit for the image forming apparatus,
wherein the data carrier apparatus changes a current value of an inter-apparatus current flowing from the data carrier drive apparatus to the data carrier apparatus according to data values of data transmitted to the data carrier drive apparatus, transmits transmission data to the data carrier drive apparatus while a communication state between the data carrier apparatus and the data carrier drive apparatus is in a first state, and transmits adjustment data to the data carrier drive apparatus while the communication state is in a second state different from the first state, and
wherein the data carrier drive apparatus comprises:
a detector configured to detect a detection value corresponding to the current value of the inter-apparatus current;
a determiner configured to determine the data value of the transmission data by comparing the detection value detected by the detector with a threshold value during the first state; and
a processor configured to update the threshold value based on the detection value detected by the detector during the second state.

* * * * *